No. 865,140. PATENTED SEPT. 3, 1907.
I. A. WEAVER.
WHEELED PLOW.
APPLICATION FILED DEC. 16, 1903. RENEWED DEC. 30, 1904.
2 SHEETS—SHEET 1.
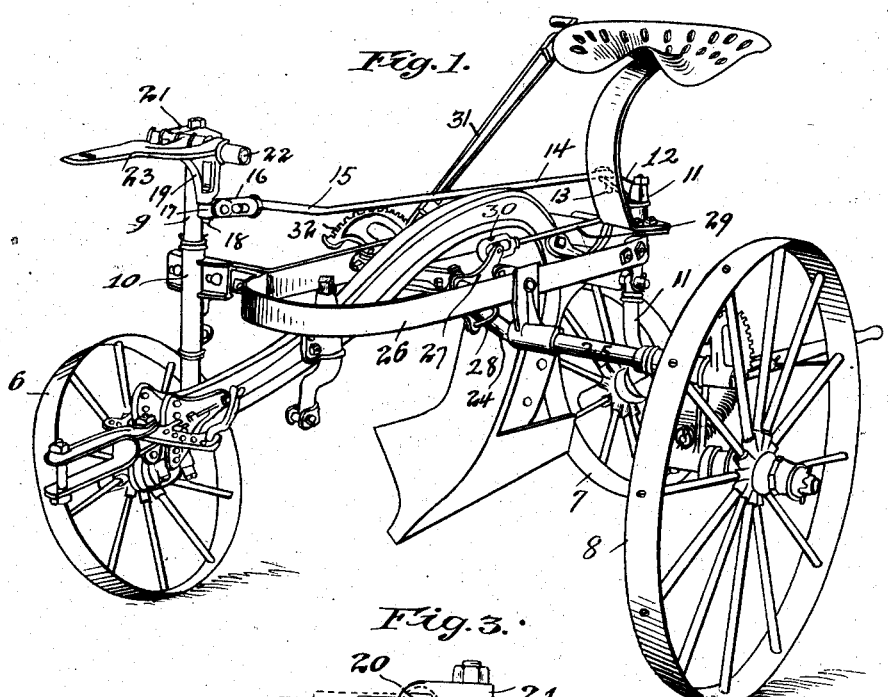

No. 865,140. PATENTED SEPT. 3, 1907.
I. A. WEAVER.
WHEELED PLOW.
APPLICATION FILED DEC. 16, 1903. RENEWED DEC. 30, 1904.
2 SHEETS—SHEET 2.
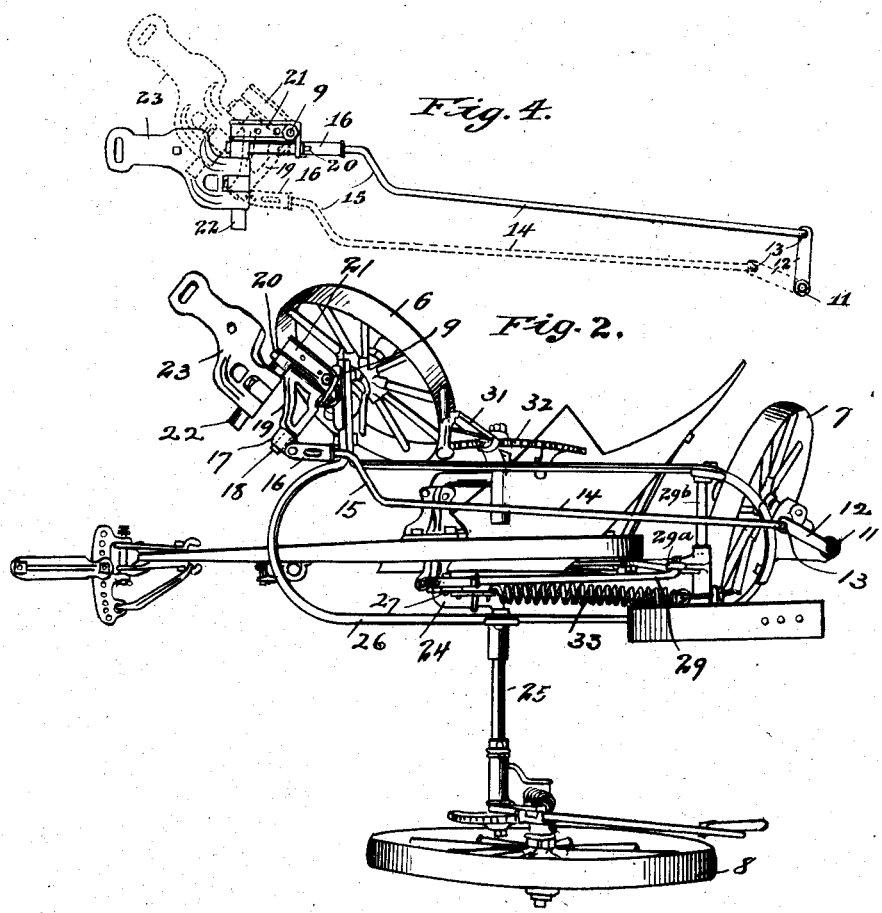
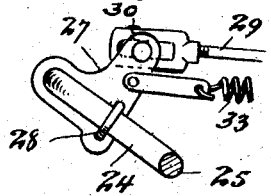
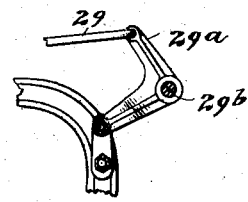
Witnesses,
Inventor,
Ira A. Weaver
By Offield, Towle & Linthicum
Attys.

UNITED STATES PATENT OFFICE.

IRA A. WEAVER, OF SPRINGFIELD, ILLINOIS.

WHEELED PLOW.

No. 865,140.            Specification of Letters Patent.            Patented Sept. 3, 1907.

Application filed December 16, 1903, Serial No. 185,385. Renewed December 30, 1904. Serial No. 238,875.

*To all whom it may concern:*

Be it known that I, IRA A. WEAVER, of Springfield, Illinois, have invented certain new and useful Improvements in Wheeled Plows, of which the following is a specification.

My invention relates to improvements in wheeled plows in which the plow frame is supported upon two wheels which run in the furrow and a land wheel. It is common in the construction of these plows to make the pole connection at or near the standard of the front furrow wheel and to provide a thrust rod which is connected at its rear end to a crank arm on the caster wheel standard and which has a variable connection to the pole casting or front furrow wheel standard. The thrust of the caster wheel is transmitted through this rod to the pole connection and it has been proposed heretofore, by means of a slotted connection, to connect the forward end of this rod in such manner that the thrust will be taken by the standard of the front furrow wheel instead of by the tongue in the ordinary operation of the plow, while in turning the thrust of the caster wheel is transmitted to the pole casting and the caster wheel permitted a rapid turning movement, while the thrust is taken by the pole and assists in its turning.

I accomplish these desirable results by means of certain improvements in the connection of the thrust rod to the standard. I have also improved the means of raising and lowering the plow, which will be hereinafter more fully described.

In the drawings: Figure 1 is a perspective view of a sulky plow embodying my improvements, the position of the parts being that which they assume when the plow is being drawn forward; Fig. 2 is a plan view of the same showing the pole and caster wheel in one position they assume in turning the plow; Fig. 3 is a detail showing the means of connecting the front end of the thrust rod to the front furrow wheel standard; Fig. 4 is a diagrammatic view indicating the movement of such connections in turning; Fig. 5 is a detail view of a part of the plow raising mechanism; and Fig. 6 is a detail view of the rear bell-crank for raising the plow beam.

In the drawings, let 6 represent the front furrow wheel, 7 the caster wheel and 8 the land wheel, upon which the frame is mounted. The front furrow wheel standard 9 passes through a sleeve bearing 10 so that it is free to turn or caster and the caster wheel 7 is similarly mounted on an upright standard 11 which is provided at its upper end with a short arm 12 having an aperture through which the bent end 13 of a thrust rod 14 passes. This thrust rod extends forwardly and is offset as shown at 15, near its front end, and is threaded into a coupling piece 16 so that it can be lengthened or shortened. The coupling piece 16 is pinned to a collar 17 which is sleeved on a bearing 18 of a swinging bracket arm 19, the latter being mounted on a hinge pin 20 carried by a casting 21 on the upper end of the standard 9. This casting also carries a short shaft 22 to which is hinged the pole casting 23. The hinge pin 20 is located in the line of forward movement of the plow and so close to the standard 9 that when the hinged bracket arm 19 is in the depending or vertical position, shown in Fig. 1, the thrust of the rod is upon the standard and does not affect the pole. In turning, as shown in Fig. 2, the distance between the standard and the point of connection of the rear end of the thrust rod to the arm 12 is decreased and this results in swinging the bracket 19 outwardly into a horizontal plane, as shown in Fig. 2, and as indicated by the full and dotted lines in Fig. 4. Thus a variable movement is provided for in a simple manner without resorting to the slotted connections heretofore used and a stronger and more efficient structure results.

Another feature of my invention relates to the manner of raising and lowering the plow. 24 represents a bail formed with the axle 25 of the land wheel and extending transversely across the frame 26. A bell crank 27 is perforated for the passage of the horizontal part of the bail 24 and is clamped to the side arm of the bail by a U bolt 28. A rod 29 has a pivotal connection at its rear end to one arm of a bell-crank $29^a$ mounted on a rock shaft $29^b$ on the frame, the other arm of said bell-crank being pivoted to the rear end of the plow beam. The forward end of rod 29 has a slotted connection with one arm of the bell-crank 27. The slotted member of the rod has a vertical aperture 30 through which a pin may be dropped to make the frame rigid with the bail. The inner end of the bail is attached to a hand lever 31 and the latter is provided with a pawl working in a ratchet 32. A spring 33 is connected at one end to the frame and at the other end to the bell crank 27 and this spring is under tension when the plow is in the ground. In raising the plow the bail is rocked by the hand lever 31, thus lifting on the beam in front of the plow and the lifting force is transmitted through rod 29 and bell-crank $29^a$ to the rear end of the plow beam and the spring assists in the lifting action.

It will be observed that the shaft $29^b$ extends across the frame from side to side, thus affording a long rigid bearing for the rear bell crank and that the latter is mounted upon said rod in such manner that it bears against the inner side of the frame and is connected to the beam by a short link. The result of this construction is that the bell crank being connected to the land side of the plow beam and having a bearing which prevents lateral movement maintains the plow beam in proper alinement and prevents the heel of the plow from running against the land side, thus obviating friction while permitting the beam to be raised and lowered.

In operation, to lower the plow the hand lever is thrown forward, thus dropping the bail and bell-cranks and extending the coils of the spring, the slotted connection of the link or rod compensating for the lowering movement. In raising the plow out of the ground, the hand lever is drawn back, thus rocking the bail upwardly, the spring assisting to raise the weight of the plow and the slotted connection of the link permitting such raising movement.

The land wheel is sleeved upon its axle and said axle can be raised or lowered independently for the purpose of leveling the plow in the usual manner. The raising and lowering mechanism as a whole is very simple and by means of the slotted connection described, the plow can enter the ground more readily and the wheels can pass over rough and uneven surfaces without throwing the weight of the frame and driver on the plow.

I claim:

1. In a wheeled plow, the combination with a caster wheel and a front furrow wheel, of a thrust rod connecting said wheels, said thrust rod being connected to the caster wheel standard by a vertically swinging link, substantially as described.

2. In a wheeled plow, the combination with a caster wheel standard and arm carried thereby, a thrust rod pivotally connected to said arm and a swinging link connection the forward end of said thrust rod to the standard, the axis of said link being arranged adjacent and at a right angle to the standard and the connection between the rod and the link being adapted to permit the latter to swing through the arc of a circle in turning, substantially as described.

3. In a wheeled plow, the combination with a caster wheel standard adapted to turn in its bearings, an arm rigid with said standard, a thrust rod pivotally connected with said arm, a front furrow wheel swiveled on said frame, a swinging link having a sleeve connection with the forward end of said thrust rod, and said link being mounted on a pivotal axis carried by the front furrow wheel standard at right angles thereto and to said sleeve, substantially as described.

4. In a wheeled plow, the combination with the carrying wheels and frame of a wheel axle journaled to the frame and provided with a bail, an arm connected with the bail, a rod connecting the frame and said arm, said rod having a slotted connection with the arm and a lifting spring connected with the bail and the frame, substantially as described.

5. In a wheeled plow, the combination with a carrying wheel having an axle provided with a bail, of a frame mounted on said axle, a plow beam pivotally connected with the bail, an arm connected with the bail, a rod having a slotted connection with the arm, a lifting-spring connected with the bail and with the frame, and a bell-crank lever pivoted on the frame and connected to the rear end of the plow beam and to the end of said rod, substantially as described.

6. In a wheeled plow, the combination with the carrying wheels and frame, of a plow beam, a bail pivotally connecting the plow beam and frame for raising and lowering the plow, and a bell crank pivotally mounted in the frame in rear of the plow upon an axle supported at each end in the frame, one arm of said bell crank being pivotally connected with the rear portion of said plow beam and the other arm connected with the bail, substantially as described.

IRA A. WEAVER.

Witnesses:
MURRAY OVERAKER,
A. P. BREWER.